US 12,221,173 B2

(12) United States Patent
Sakayori et al.

(10) Patent No.: US 12,221,173 B2
(45) Date of Patent: Feb. 11, 2025

(54) STEERING CONTROL DEVICE AND STEERING CONTROL METHOD (71) Applicant: Hitachi Astemo, Ltd., Hitachinaka (JP)

(72) Inventors: Go Sakayori, Tokyo (JP); Tomoaki Fujibayashi, Hitachinaka (JP); Hiroki Sonoda, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 385 days.

(21) Appl. No.: 17/761,340

(22) PCT Filed: Sep. 10, 2020

(86) PCT No.: PCT/JP2020/034275
§ 371 (c)(1),
(2) Date: Mar. 17, 2022

(87) PCT Pub. No.: WO2021/065408
PCT Pub. Date: Apr. 8, 2021

(65) Prior Publication Data
US 2022/0340195 A1  Oct. 27, 2022

(30) Foreign Application Priority Data
Oct. 1, 2019 (JP) ................. 2019-181089

(51) Int. Cl.
*B62D 5/00* (2006.01)
*B62D 5/04* (2006.01)
*B62D 15/02* (2006.01)

(52) U.S. Cl.
CPC ......... *B62D 5/0457* (2013.01); *B62D 15/021* (2013.01)

(58) Field of Classification Search
CPC .. B62D 5/0457; B62D 15/021; B62D 15/027; B62D 6/02; B62D 6/002; B62D 5/00
(Continued)

(56) References Cited

U.S. PATENT DOCUMENTS 8,825,297 B2 * 9/2014 Tanimoto ............... B62D 6/002
180/443
2004/0068353 A1   4/2004 Momiyama et al.
(Continued)

FOREIGN PATENT DOCUMENTS

JP    2002-046639 A    2/2002
JP    2003-081109 A    3/2003
(Continued)

OTHER PUBLICATIONS

International Search Report with English translation and Written Opinion issued in corresponding application No. PCT/JP2020/034275 dated Nov. 24, 2020.

*Primary Examiner* — Shardul D Patel
(74) *Attorney, Agent, or Firm* — Foley & Lardner LLP (57) ABSTRACT An object of the present invention is to provide a steering control device and a steering control method that can reduce a driving burden imposed on a driver during low velocity driving. The present invention is provided with an arithmetic logic unit that changes a steering angle of a wheel 11 by driving a wheel steering actuator 7 based on a manipulated variable of a steering 3, and calculates a controlled variable of the wheel steering actuator 7. In turning the steering 3, the arithmetic logic unit controls the wheel steering actuator 7 based on a first gain at which a ratio of an actual steering angle of the wheel 11 changes with respect to a steering angle δ, and in returning the steering 3, the arithmetic logic unit controls the wheel steering actuator 7 based on a second gain that differs from the first gain.

14 Claims, 7 Drawing Sheets (58) Field of Classification Search
USPC .......................................................... 701/41
See application file for complete search history.

(56) References Cited

U.S. PATENT DOCUMENTS

| | | | |
|---|---|---|---|
| 2010/0025144 | A1 | 2/2010 | Huang et al. |
| 2010/0094505 | A1* | 4/2010 | Kariatsumari ......... B62D 5/046 |
| | | | 701/41 |
| 2015/0134204 | A1* | 5/2015 | Kunihiro ................ B60R 21/00 |
| | | | 701/41 |
| 2017/0080969 | A1* | 3/2017 | Ieyasu .................. B62D 5/0463 |
| 2017/0334482 | A1* | 11/2017 | Kojima .................. G01B 21/22 |
| 2018/0079406 | A1* | 3/2018 | Izumi .................... B60W 10/20 |
| 2021/0206426 | A1 | 7/2021 | Kitazume et al. |

FOREIGN PATENT DOCUMENTS

| | | |
|---|---|---|
| JP | 2004-042796 A | 2/2004 |
| JP | 2007-090924 A1 | 4/2007 |
| JP | 2007-137400 A | 6/2007 |
| JP | 2008-062788 A | 3/2008 |
| JP | 2012-228988 A | 11/2012 |
| JP | 2012-254705 A | 12/2012 |
| JP | 2016-107871 A | 6/2016 |
| JP | 6428965 B1 | 11/2018 |

* cited by examiner

STEERING CONTROL DEVICE AND STEERING CONTROL METHOD

TECHNICAL FIELD

The present invention relates to a steering control device and a steering control method.

BACKGROUND ART

With respect to a steering control device where a steering manipulation performed by a driver is transmitted to wheels to be steered by an assist force of an electrically operated motor, there has been known a technique where a steering angle of wheels to be steered is controlled corresponding to a situation of a vehicle in response to the steering manipulation performed by the driver. For controlling the steering angle, the steering control device includes a variable steering mechanism that changes a gear ratio of a steering. Such a technique is disclosed in patent literature 1 and patent literature 2, for example.

In the technique described in patent literature 1, a gear ratio Ga1 at the time of turning a steering or a gear ratio Ga2 at the time of returning the steering is selected in response to the turning direction of the steering. At the time of turning the steering, the gear ratio Gb1 corresponding to a vehicle velocity V is determined by looking up a velocity-gear ratio map, the gear ratio gain Gb2 corresponding to the vehicle velocity V is determined by looking up a steering angle velocity-gear ratio gain map, and the gear ratio Ga1 at the time of turning the steering by multiplying the gear ratio Gb1 with the gear ratio gain Gb2. Then, in a case where the velocity V is low, the gear ratio Gb1 is set high such that an actual steering angle by wheels to be steered can be largely obtained even when a steering angle by a steering manipulation is small. In a case of a sudden steering manipulation, the gear ratio gain Gb2 is set lower than 1 so as to prevent a delay in following the steering manipulation. Further, at the time of returning the steering, a gear ratio Ga2 that differs from the gear ratio Ga1 at the time of turning the steering is selected so as to position the steering at the neutral position.

Next, patent literature 2 describes the following technique. Gains are adjusted so as to decrease an output in a region where a steering torque and an assist torque are small so that smooth return steering feeling is realized by a handle return control.

CITATION LIST

Patent Literature

Patent Literature 1: Japanese Patent Laid-Open No. 2004-42796
Patent Literature 2: Japanese Patent No. 6428965

SUMMARY OF INVENTION

Technical Problem

Figure 6:
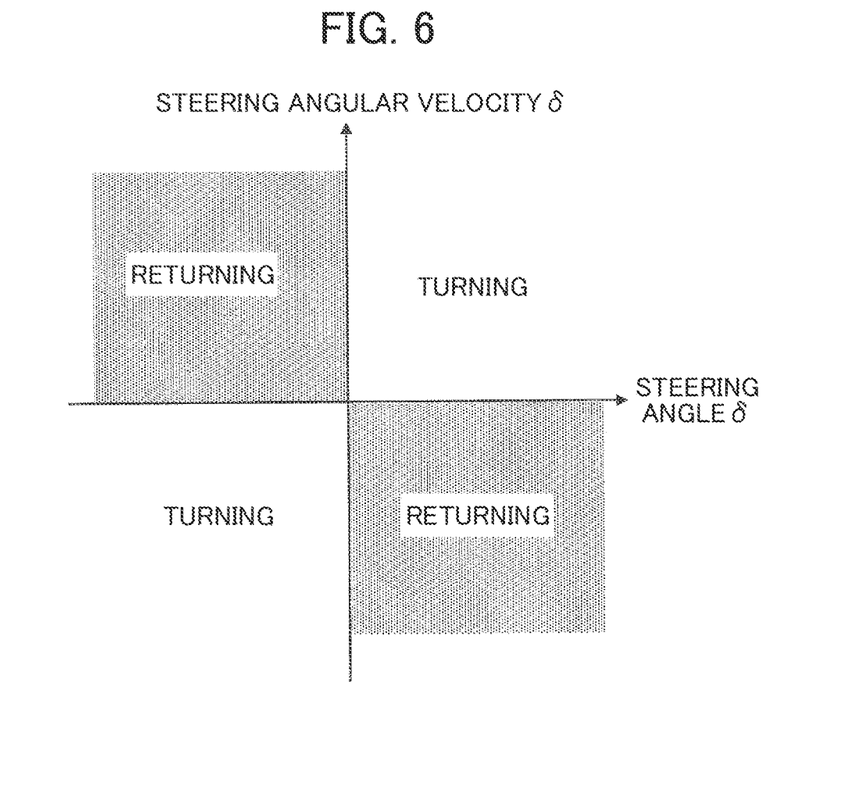
FIG. 6 is a view illustrating a relationship between a steering angle δ and a steering angular velocity δ' in the embodiment.

In the technique described in patent literature 1, as illustrated in FIG. 6(A)(B), a control is made such that the gear ratio Ga1 and the gear ratio Ga2 are changed linearly at predetermined gradients up to predetermined velocities, and the linear gradients are changed to other gradients when the predetermined velocities are achieved. Accordingly, sudden changes in gear ratios occur at the velocities where the gradients of the gear ratios are changed. In this case, there arises a drawback that a driver feels discomfort in a steering manipulation.

In the technique disclosed in patent literature 2, although gains of the steering torque and the assist torque are changed, a steering angle is not changed in response to a steering manipulation. Accordingly, at the time of performing retracting parking such as garaging where driving is performed at a low velocity, it is necessary to largely turn the steering and hence, there arises a drawback that a large driving burden is imposed on a driver.

It is an object of the present invention to provide a steering control device and a steering control method that can reduce a driving burden imposed on a driver during low velocity driving.

Solution to Problem

To achieve the above-mentioned object, according to an aspect of the present invention, there is provided a steering control device that includes an arithmetic logic unit configured to change a steering angle of a wheel to be steered by driving a wheel steering actuator based on a manipulated variable of a steering, and configured to calculate a controlled variable of the wheel steering actuator, wherein in turning the steering, the arithmetic logic unit is configured to control the wheel steering actuator based on a first gain at which a ratio of an actual steering angle of the wheel to be steered changes with respect to a steering angle, and in returning the steering, the arithmetic logic unit is configured to control the wheel steering actuator based on a second gain that differs from the first gain.

According to another aspect of the present invention, there is provided a steering control method for steering a wheel to be steered by controlling a wheel steering actuator based on a manipulated variable of a steering, wherein in turning the steering, the wheel to be steered is steered based on a first gain at which a ratio of an actual steering angle of the wheel to be steered changes with respect to a steering angle, and in returning the steering, the wheel to be steered is steered based on a second gain that differs from the first gain.

Advantageous Effects of Invention

According to the present invention, it is possible to provide a steering control device and a steering control method capable of reducing a driving burden imposed on a driver during low velocity driving.

DESCRIPTION OF EMBODIMENTS

Hereinafter, an embodiment of the present invention is described with reference to attached drawings. Substantially identical constitutional elements are given the same symbols, and the repeated description of these constitutional elements is omitted.

Various kinds of constitutional elements of the present invention are not always necessary to be individually independent from each other, and it is allowed that one constitutional element is formed of a plurality of members, a plurality of constitutional elements are formed of one member, a certain constitutional element is a part of a constitutional element that forms a separate body from the certain constitutional element, a part of a certain constitutional element overlaps with a part of another constitutional element, and the like.

In the embodiment, the description is made by taking a steer-by-wire system that has no mechanical coupling between a steering and a tire as an example. The steer-by-wire system is a system that can independently control a change in a steering amount by the steering and a change in a turning angle of the tire.

Figure 1:
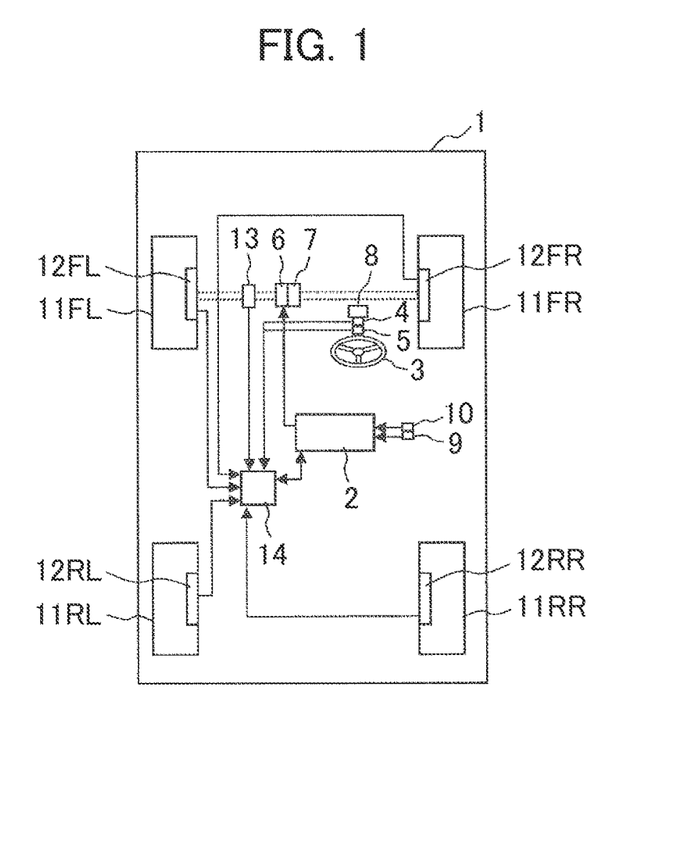
FIG. 1 is a schematic configurational view of a vehicle 1 on which a steering control device 2 according to an embodiment is mounted.

FIG. 1 is a schematic configurational view of a vehicle 1 on which a steering control device 2 according to the embodiment is mounted. In FIG. 1, the vehicle 1 includes: a steering 3 that a driver manipulates; a steering angle sensor 4 that detects a steering angle of the steering 3; a steering torque sensor 5 that detects a steering torque input to the steering 3; an actual steering angle control unit 6 that controls actual steering angles of wheels 11; a wheel steering actuator 7 that is controlled by the actual steering angle control unit 6 and changes steering angles of the wheels 11 (a right front wheel 11FR and a left front wheel 11FL); a pseudo steering reaction force generation device 8 that generates a reaction force caused by steps or the like in a pseudo manner, and transmits a pseudo reaction to the steering 3; an acceleration sensor 9 that detects an acceleration of the vehicle 1; and a gyro sensor 10 that detects inclination of the vehicle 1. A detection signal of the acceleration sensor 9 and a detection signal of the gyro sensor 10 are transmitted to the steering control device 2.

The vehicle 1 includes four wheels 11 (the right front wheel 11FR, the left front wheel 11FL, a right rear wheel 11RR, a left rear wheel 11RL). The right front wheel 11FR and the left front wheel 11FL form wheels to be steered that are driven by the wheel steering actuator 7 so as to change an advancing direction of the vehicle 1. Wheel velocity sensors 12 (a right front wheel velocity sensor 12 FR, a left front wheel velocity sensor 12FL, a right rear wheel velocity sensor 12RR, and a left rear wheel velocity sensor 12RL) are mounted on four wheels respectively.

A power transmission unit that connects the wheels 11 (the right front wheel 11FR, the left front wheel 11FL: wheels to be steered) and the wheel steering actuator 7 to each other includes an actual steering angle sensor 13 that detects an actual steering angle of the wheels 11 based on an operation situation of the wheel steering actuator 7.

The wheel steering actuator 7 drives the wheels to be steered based on a manipulated variable of the steering 3, and changes a steering angle of the wheels to be steered. A controlled variable of the wheel steering actuator 7 that drives the wheels to be steered is calculated by an arithmetic logic unit described later.

Detection signals of the steering angle sensor 4, the steering torque sensor 5, the actual steering angle sensor 13, the right front wheel velocity sensor 12FR, the left front wheel velocity sensor 12FL, the right rear wheel velocity sensor 12RR, the left rear wheel velocity sensor 12RL are transmitted to the steering control device 2 via a communication bus line 14.

Figure 2:
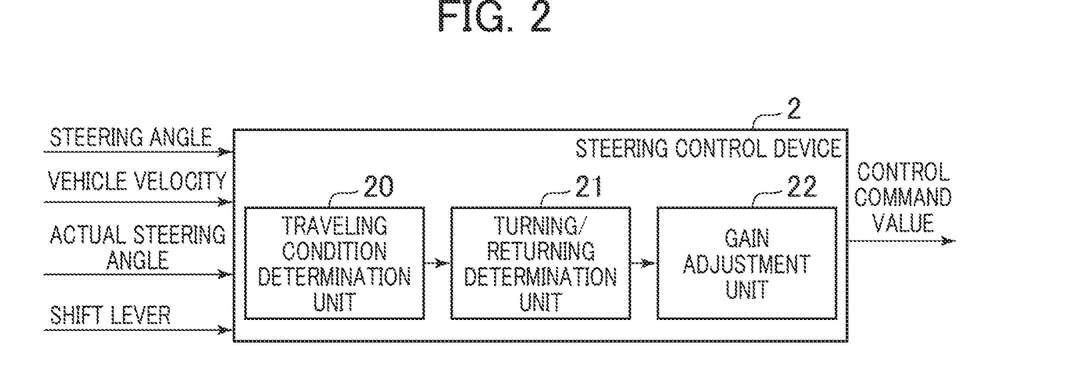
FIG. 2 is a block diagram of the steering control device 2 according to the embodiment.

Next, the configuration of the steering control device 2 is described. FIG. 2 is a block diagram of the steering control device 2 according to the embodiment. The steering control device 2 includes a traveling condition determination unit 20, a turning/returning determination unit 21, and a gain adjustment unit 22. To the steering control device 2, signals are input. Such signals are formed of: a signal relating to a steering angle detected by the steering angle sensor 4; signals relating to a vehicle velocity detected by the wheel velocity sensor 12 and the acceleration sensor 9; actual steering angles of the wheels 11 detected by the actual steering angle sensor 13; and a signal relating to a moving direction of the vehicle such as advancing or retracting from the position of the shift lever. Although not illustrated in the drawing, the steering control device 2 is one function of an electronic control unit (ECU) that includes hardware such as an arithmetic logic unit such as a central processing unit (CPU), a main storage unit, an auxiliary storage unit, a communication unit and the like. The steering control device 2 realizes the respective functions of the traveling condition determination unit 20, the turning/returning determination unit 21, and the gain adjustment unit 22 by allowing the arithmetic logic unit to execute programs loaded into the main storage device by looking up a database stored in the auxiliary storage device.

Figure 3:
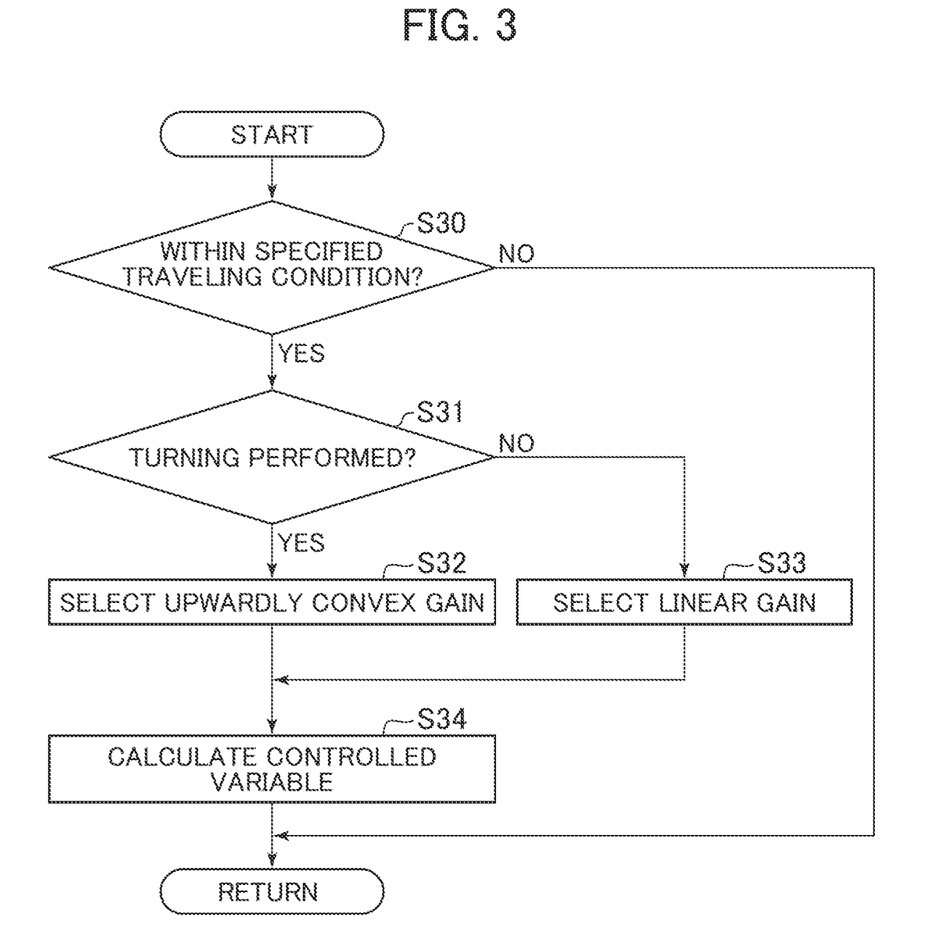
FIG. 3 is a flowchart illustrating processing of the steering control device according to the embodiment.
Figure 4:
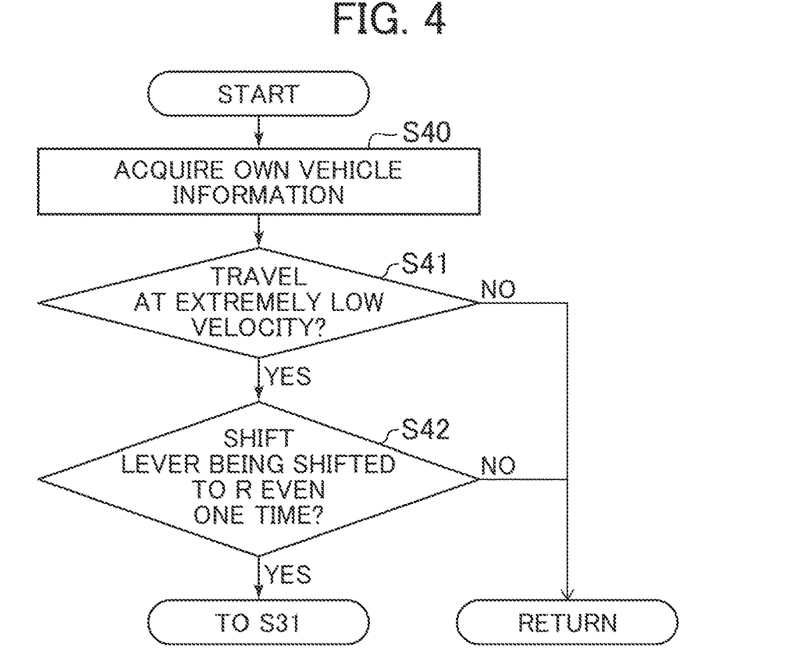
FIG. 4 is a flowchart illustrating processing in step S30 in FIG. 3.
Figure 5:
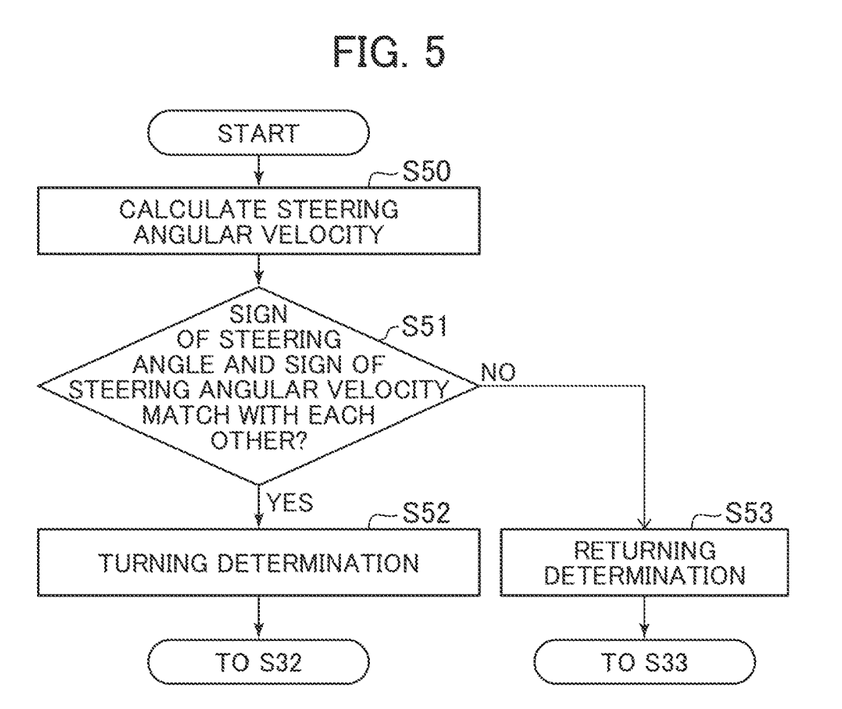
FIG. 5 is a flowchart illustrating processing in step S31 in FIG. 3.

Next, processing performed by the arithmetic logic unit of the steering control device 2 is described. FIG. 3 is a flowchart illustrating processing of the steering control device according to the embodiment. FIG. 4 is a flowchart illustrating processing in step S30 in FIG. 3. FIG. 5 is a flowchart illustrating processing in step S31 in FIG. 3.

In step S30, the traveling condition determination unit 20 of the steering control device 2 determines whether or not the vehicle 1 exists within a specified traveling condition. The specified traveling condition means retracting parking such as garaging, for example. Processing performed by the traveling condition determination unit 20 in step S30 is described with reference to FIG. 4. In FIG. 4, the traveling condition determination unit 20 acquires own vehicle information such as a starting state of the own vehicle (step S40). Next, the traveling condition determination unit 20 determines whether or not the vehicle 1 is traveling at an extremely low velocity based on signals detected by the wheel velocity sensor 12 and the acceleration sensor 9 (step S41). The extremely low velocity means a velocity less than 5 km/h at the time of performing garaging, for example. In the embodiment, in detecting a velocity (vehicle velocity) of the vehicle 1, the acceleration sensor 9 is used in addition to the wheel velocity sensors 12. When the wheel 11 causes slipping, there is a case where the vehicle velocity is erroneously detected. To prevent such an erroneous detection, in the embodiment, the acceleration sensor 9 is used in addition to the wheel velocity sensor 12.

In step S41, when the vehicle 1 is traveling at an extremely low velocity, the traveling condition determination unit 20 determines whether or not a shift lever is shifted to an R position (retracting position) even one time (step S4). In a parking pattern such as parallel parking or retracting parking, it is often the case where the vehicle 1 repeats advancing and retracting. Accordingly, the shift lever is shifted to a retracting (R) position at least once. When the shift lever is shifted to the retracting position (R position) even one time, the processing advances to step S31.

In step S41, when the vehicle 1 is parked or a vehicle velocity of the vehicle 1 is at a low velocity or above (for example, 5 km/h or more) (No in step S41), the processing returns to "Start", and the processing is repeated. In step S42, when the shift lever is not shifted to the R position even one time (No in step S42), the processing returns to Start, and the processing is repeated. "No in step 41" and "No in step 42" correspond to "No" in step 30.

In the embodiment, the arithmetic logic unit is configured to control the wheel steering actuator 7 based on a first gain and a second gain as described later on a condition that a vehicle velocity is less than a predetermined velocity and the shift lever is shifted to a retracting position.

Returning to FIG. 3, in step S31, the turning/returning determination unit 21 of the steering control device 2 determines whether or not steering 3 is a turning state. Processing in step S31 performed by the turning/returning determination unit 21 is described with reference to FIG. 5.

In FIG. 5, the turning/returning determination unit 21 calculates a steering angular velocity of the steering 3 based on a signal from the steering angle sensor 4. In step S51, the turning/returning determination unit 21 determines whether or not a sign (positive or negative) of a steering angle δ, and a sign (positive or negative) of a steering angular velocity δ' match with each other.

The sign (positive or negative) of the steering angle δ, and the sign (positive or negative) of the steering angular velocity δ' are described with reference to FIG. 6. FIG. 6 is a view illustrating a relationship between the steering angle δ and a steering angular velocity δ' in the embodiment. In the drawing, an intersection between an axis of ordinates and an axis of abscissas is a position where the steering 3 is neutral (neutral point), and indicates that the rotation of the steering 3 is stopped (velocity being 0).

The steering is turned toward a left side and toward a right side and hence, the sign of the steering angle δ and the sign of the steering angular velocity δ' are changed to "positive" and "negative" using the neutral point as a boundary. For example, assuming the steering angle δ when the steering 3 is turned toward a right side as "positive" (a region on a right side), the steering angle δ when the steering 3 is turned toward a left side becomes "negative" (a region on a left side).

On the other hand, assuming the steering angular velocity δ' when the steering 3 is turned toward a right side as "positive" (a region on an upper side), the steering angular velocity δ' when the steering 3 is turned toward a left side and when the steering 3 that is turned toward a right side is returned becomes "negative" (a region on a lower side). In addition, the steering angular velocity δ' when the steering 3 that is turned toward a left side is returned becomes "positive" (a region on an upper side).

To recapitulate the above, a four-quadrant graph illustrated in FIG. 6 is obtained. A first quadrant (right upper side) and a third quadrant (left lower side) indicate that the steering 3 is in a turning state. A second quadrant (left upper side) and a fourth quadrant (right lower side) indicate that the steering 3 is in a returning state. That is, when the sign of the steering angle δ and the sign of the steering angular velocity δ' match with each other (the first quadrant and the third quadrant: positive-positive or negative-negative), the steering 3 is in a turning state. On the other hand, when the sign of the steering angle δ and the sign of the steering angular velocity δ' do not match with each other (the second quadrant and the fourth quadrant: positive-negative or negative-positive), the steering 3 is in a returning state.

Returning to FIG. 5, in step S51, when the sign of the steering angle δ and the sign of the steering angular velocity δ' match with each other (Yes), the turning/returning determination unit 21 determines that the steering 3 is in a turning state (step S52), and the processing advances to step S32. On the other hand, in step S51, when the sign of the steering angle δ and the sign of the steering angular velocity δ' do not match with each other (No), the turning/returning determination unit 21 determines that the steering 3 is in a returning state (step S53), and the processing advances to step S33.

Returning to FIG. 3, the processing at the time of turning the steering 3 and the processing at the time of returning the steering 3 are described. The embodiment is characterized in that, in turning the steering 3, the wheel steering actuator 7 is controlled based on a gain (first gain) at which a ratio of an actual steering angle of the wheels to be steered (the right front wheel 11FR, the left front wheel 11FL) changes with respect to the steering angle, and in returning the steering 3, the wheel steering actuator 7 is controlled based on a gain (second gain) that differs from the first gain.

In step S31, when the steering 3 is in a turning state, a gain (first gain) that is a continuous function where a ratio of an actual steering angle of the wheels to be steered with respect to a steering angle of the steering takes an upwardly convex shape is selected (step S32). The continuous function that takes an upwardly convex shape is calculated based on a steering angle δ and a steering angular velocity δ'.

On the other hand, when the steering 3 is not in a turning state (the steering is in a returning state), a linear gain (second gain) that is a function where the ratio of the actual steering angle of the wheels to be steered is proportional with respect to the steering angle of the steering is selected (step S33).

Then, in step S34, controlled variables corresponding to respective gains are calculated, and a calculation result is transmitted from the steering control device 2 to the actual steering angle control unit 6, and the wheel steering actuator 7 is controlled by the actual steering angle control unit 6. Then, the wheels 11 are steered by the wheel steering actuator 7.

Figure 7:
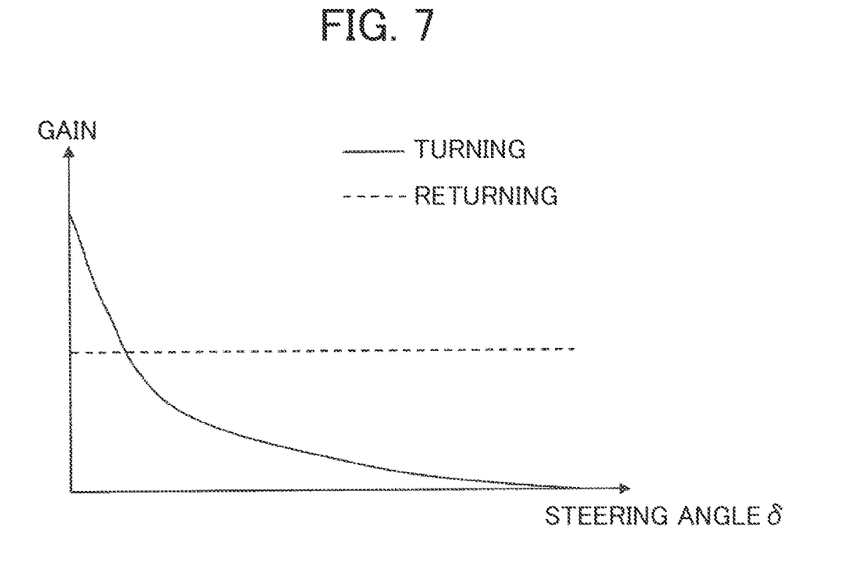
FIG. 7 is a view illustrating a relationship between a gain and the steering angle δ in the embodiment.

Next, the relationship between steering angle δ and a gain is described with reference to FIG. 7. FIG. 7 is a view illustrating a relationship between a gain and a steering angle δ. A gain is taken on an axis of ordinates, and a steering angle δ is taken on an axis of abscissas. In FIG. 7, with respect to a gain at the time of turning the steering 3, the gain is high at a position where the steering angle δ is small, and gradually changes so as to form a rightward lowering curve along with the increase of the steering angle δ. On the other hand, at the time of returning the steering 3, a gain does not change depending on a steering angle δ and is set to a fixed value.

Next, the relationship between the steering angle δ and an actual steering angle δf when the gains in FIG. 7 are used is described.

Figure 8:
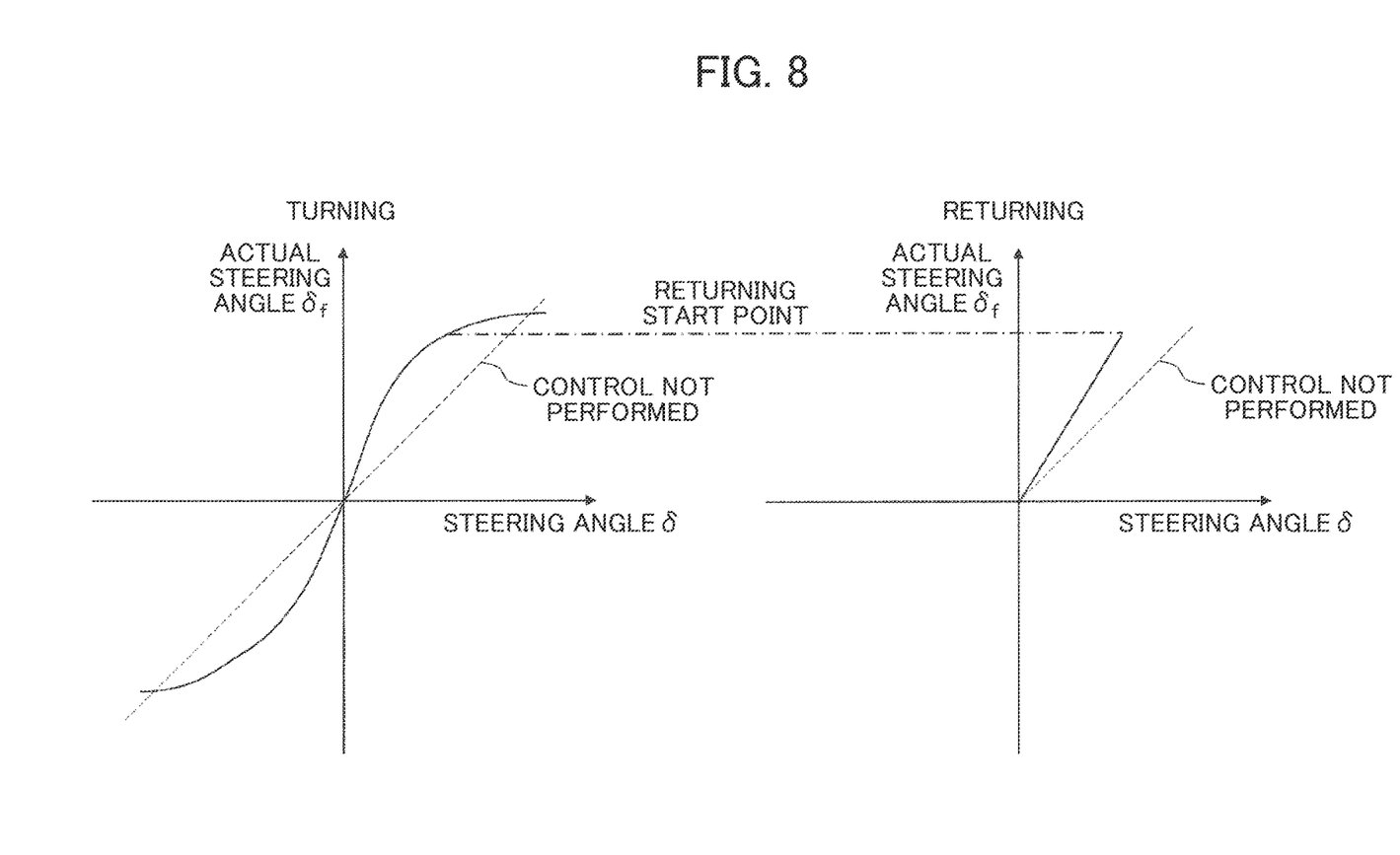
FIG. 8 is a view illustrating a relationship between the steering angle δ and an actual steering angle δf at the time of turning a steering and at the time of returning the steering in the embodiment.

FIG. 8 is a view illustrating a relationship between a steering angle δ and an actual steering angle δf at the time of turning the steering 3 and at the time of returning the steering 3 in the embodiment. In FIG. 8, a steering angle δ is taken on an axis of abscissas, and an actual steering angle δf is taken on an axis of ordinates. A gain is described as a function where a ratio of the actual steering angle δf (output) with respect to the steering angle δ (input) changes.

When a control of changing a gain is not performed at the time of turning the steering 3 and at the time of returning the steering 3, a gain of the actual steering angle δf with respect to the steering angle δ becomes as indicated by a dotted line (control not performed).

In the embodiment, at the time of turning the steering 3, the gain (first gain) that is a continuous function and takes an upwardly convex upward shape is set compared to the dotted line (control not performed). The gain that takes an upwardly convex shape forms a continuously smooth curve. A gradient of the continuous function that takes an upwardly convex shape is set such that the smaller an absolute value of the steering angle δ, the larger the gradient becomes, and the closer the absolute value of the steering angle δ approaches to a limit value, the gradient approaches to 0.

For example, in performing retracting parking such as garaging, a turning amount of the steering 3 is increased.

Accordingly, in the embodiment, at the time of starting the turning of the steering 3, an actual steering angle δf of the wheels 11 with respect to (in response to) the steering angle δ is made large so that the actual steering angle δf of the wheels 11 with respect to the steering angle δ is gradually increased along with the increase of the steering angle δ.

In the embodiment, at the time of turning the steering 3, a gain (first gain) forming a curve that takes an upwardly convex shape compared to the dotted line (control not performed) is selected, and an actual steering angle δf of the wheels 11 with respect to the steering angle δ is changed based on the first gain. Accordingly, in retracting parking such as garaging, a turning manipulated variable of the steering 3 can be reduced and hence, a driving burden imposed on a driver can be reduced.

Further, in the embodiment, at the time of returning the steering 3, when a steering angle δ is not in the vicinity of a maximum value (not in a state close to stationary driving), a linear gain (second gain) that increases a gradient compared to the dotted line (control not performed) is adopted.

For example, in performing retracting parking such as garaging, when the direction of the vehicle 1 and the retracting direction of a parking space agree with each other, it is desirable that returning of the steering 3 be quickly performed. Accordingly, in the embodiment, in returning the steering 3, an actual steering angle δf of the wheels 11 with respect to the steering angle δ is increased so as to quickly return the actual steering angle δf of the wheels 11 with respect to the steering angle δ to the neutral position.

A gradient of the linear gain (second gain) may be changed based on the actual steering angle to the wheels to be steered. In this case, in the arithmetic logic unit of the steering control device 2, the linear gain (second gain) is calculated such that a ratio between the steering angle δ and an actual steering angle of the wheels to be steered is calculated based on an actual steering angle of the wheels to be steered at the time of starting returning of the steering.

In the embodiment, a returning manipulated variable of the steering 3 at the time of retracting parking such as garaging can be reduced and hence, a burden imposed on a driver can be reduced.

Figure 9:
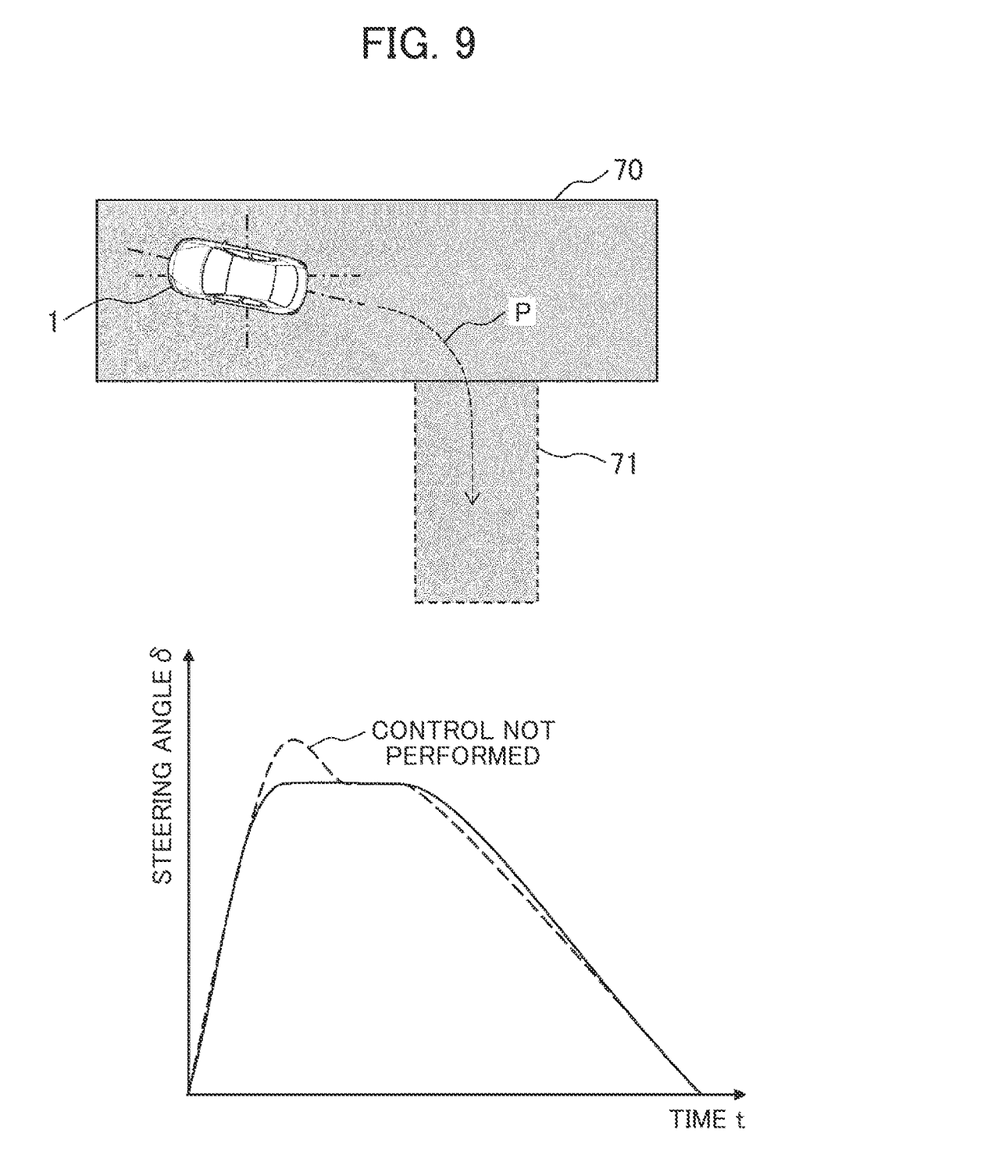
FIG. 9 is a view illustrating a relationship between a steering angle δ and a time at the time of performing retracting parking in the embodiment.

Next, a relationship between the steering angle δ and a time at the time of performing retracting parking of the vehicle 1 is described. FIG. 9 is a view illustrating the relationship between the steering angle δ and a time at the time of performing retracting parking in the embodiment.

The vehicle 1 is stopped on a roadway 70, and a driver is going to perform retracting parking toward a parking space 71. The vehicle 1 moves on a trajectory P, and moves to the parking space 71. In performing the retracting parking, the driver is required to perform a large steering manipulation. When an actual steering angle is not controlled with respect to the steering angle δ, in shifting a manipulation of the steering 3 from turning to returning, the relationship between the steering angle δ and a time t takes a curve indicated by a dotted line.

To the contrary, in the embodiment, in turning the steering 3 as illustrated in FIG. 8, with the use of the gain that takes an upwardly convex curve, when the actual steering angle is controlled with respect to the steering angle δ, the relationship between the steering angle δ and the time t takes a curve indicated by a solid line. That is, in retracting parking, in the embodiment, compared to the case where the actual steering angle is not controlled with respect to the steering angle δ, the steering angle δ can be made small and hence, a manipulated variable of the steering 3 by a driver can be reduced. Accordingly, a driving burden imposed on a driver can be reduced.

Figure 10:
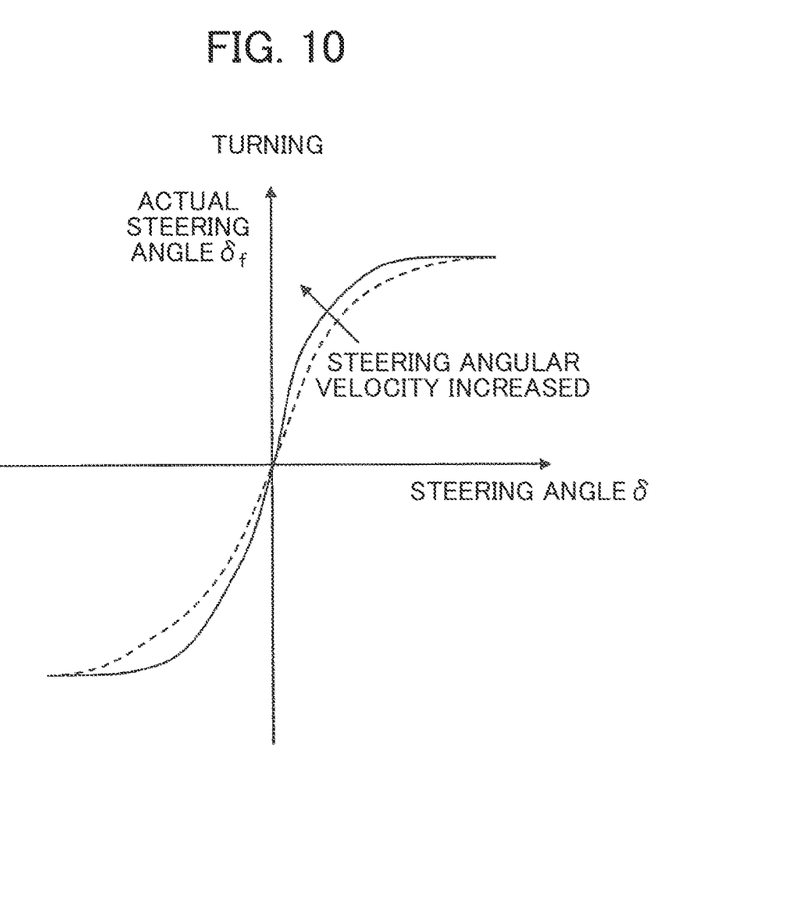
FIG. 10 is a view illustrating a relationship between a steering angle δ, an actual steering angle δf and a steering angular velocity at the time of turning a steering in the embodiment.

FIG. 10 is a view illustrating a relationship between a steering angle δ, an actual steering angle δf and a steering angular velocity at the time of turning the steering 3 in the embodiment.

In the embodiment, an actual steering angle δf is changed with respect to a steering angle δ based on a gain that takes an upwardly convex shape. However, the gain that changes the actual steering angle δf may be changed in response to a steering angular velocity.

A gradient of a continuous function that takes an upwardly convex shape is set such that the larger an absolute value of the steering angular velocity, the larger the gradient becomes, and the closer the absolute value of the steering angle δ approaches to a limit value, the gradient approaches to 0.

When the gradient of a continuous function that takes an upwardly convex shape is increased, the steering angular velocity is increased so that the actual steering angle δf is increased with respect to the steering angle δ.

Gains may be used such that a plurality of patterns are stored in auxiliary storage unit in advance, appropriate gains are selected from the plurality of gains from a result calculated based on the steering angle δ and the steering angular velocity, and programs of the selected gains are loaded into the main storage device and are executed by the arithmetic logic unit.

In the embodiment, the appropriate gains are selected corresponding to the steering angle δ and the steering angular velocity and hence, the gains can be switched corresponding to a turning velocity of the steering 3 by a driver whereby a driving burden imposed on the driver can be reduced.

The present invention is not limited to the above-mentioned embodiment, and the present invention includes various modifications.

The above-mentioned embodiment is described in detail for facilitating the understanding of the present invention. Accordingly, the present invention is not necessarily limited to the steering control device that includes all the configurations described above.

LIST OF REFERENCE SIGNS

1: vehicle
2: steering control device
3: steering
4: steering angle sensor
5: steering torque sensor
6: actual steering angle control unit
7: wheel steering actuator
8: pseudo steering reaction generation device
9: acceleration sensor
10: gyro sensor
11: wheel
11FL: left front wheel
11FR: right front wheel
11RL: left rear wheel
11RR: right rear wheel
12: wheel velocity sensor
12FL: left front wheel velocity sensor
12FR: right front wheel velocity sensor
12RL: left rear wheel velocity sensor
12RR: right rear wheel velocity sensor
13: actual steering angle sensor
14: communication bus line
20: traveling condition determination unit
21: turning/returning determination unit
22: gain adjustment unit
70: roadway
71: parking space

The invention claimed is:

1. A steering control device comprising an arithmetic logic unit configured to change a steering angle of a wheel to be steered by driving a wheel steering actuator based on a manipulated variable of a steering, and configured to calculate a controlled variable of the wheel steering actuator, wherein
in turning the steering, the arithmetic logic unit is configured to control the wheel steering actuator based on a first gain at which a ratio of an actual steering angle of the wheel to be steered changes with respect to a steering angle,
in returning the steering, the arithmetic logic unit is configured to control the wheel steering actuator based on a second gain that differs from the first gain, and
the arithmetic logic unit is configured to control the wheel steering actuator based on the first gain and the second gain on a condition that a vehicle velocity is less than a predetermined velocity and a shift lever is shifted to a retracting position.

2. The steering control device according to claim 1, wherein the first gain takes a continuous value.

3. The steering control device according to claim 1, wherein the first gain is a continuous function where a ratio of the actual steering angle of the wheel to be steered with respect to the steering angle takes an upwardly convex shape.

4. The steering control device according to claim 3, wherein the continuous function that takes the upwardly convex shape is calculated based on the steering angle and a steering angular velocity.

5. The steering control device according to claim 3, wherein the smaller an absolute value of a steering angle, the larger a gradient of the continuous function that takes the upwardly convex shape becomes.

6. The steering control device according to claim 3, wherein the larger an absolute value of a steering angular velocity, the larger a gradient of the continuous function that takes the upwardly convex shape becomes.

7. The steering control device according to claim 3, wherein the closer an absolute value of the steering angle approaches to a limit value, the closer a gradient of the continuous function that takes the upwardly convex shape approaches to 0.

8. The steering control device according to claim 1, wherein the second gain has a linear shape.

9. The steering control device according to claim 8, wherein the arithmetic logic unit is configured to calculate a ratio between the steering angle and an actual steering angle of the wheel to be steered based on the actual steering angle of the wheel to be steered at the time of starting returning of the steering.

10. A steering control method for steering a wheel coupled to a vehicle to be steered by controlling a wheel steering actuator based on a manipulated variable of a steering, comprising:
a steering control device configured to:
determine, via signals from a wheel velocity sensor and an acceleration sensor, that a vehicle velocity is less than a predetermined velocity, and that a shift lever is shifted to a retracted position;
determine, that the vehicle is in a turning state based on a signal from a steering angle sensor;
turning, the steering of the wheel, based on a first gain at which a ratio of an actual steering angle of the wheel to be steered changes with respect to a steering angle,
calculating, the manipulated variable of the steering, the manipulated variable transmitted to the wheel steering actuator to steer the wheel, and
returning, the steering of the wheel, based on a second gain that differs from the first gain.

11. The steering control method according to claim 10, wherein the first gain takes a continuous value.

12. The steering control method according to claim 10, wherein the first gain is a continuous function where a ratio of the actual steering angle of the wheel to be steered with respect to the steering angle takes an upwardly convex shape.

13. The steering control method according to claim 10, wherein the second gain has a linear shape.

14. The steering control method according to claim 10, wherein determining that the vehicle is in the turning state is based on a sign of a steering angle and a sign of a steering angle velocity matching.

* * * * *